(12) United States Patent
Griffith

(10) Patent No.: US 10,850,758 B1
(45) Date of Patent: Dec. 1, 2020

(54) TELESCOPING CART APPARATUS AND METHOD

(71) Applicant: Cara Patrice Griffith, Freeport, FL (US)

(72) Inventor: Cara Patrice Griffith, Freeport, FL (US)

( * ) Notice: Subject to any disclaimer, the term of this patent is extended or adjusted under 35 U.S.C. 154(b) by 71 days.

(21) Appl. No.: 16/424,846

(22) Filed: May 29, 2019

Related U.S. Application Data

(60) Provisional application No. 62/677,206, filed on May 29, 2019.

(51) Int. Cl.
*B62B 3/02* (2006.01)
*B62B 3/00* (2006.01)
*B62B 5/00* (2006.01)
*B62B 5/06* (2006.01)
*B62B 3/14* (2006.01)

(52) U.S. Cl.
CPC ............... *B62B 3/02* (2013.01); *B62B 3/003* (2013.01); *B62B 3/1472* (2013.01); *B62B 5/0003* (2013.01); *B62B 5/06* (2013.01); *B62B 2202/50* (2013.01); *B62B 2206/06* (2013.01)

(58) Field of Classification Search
CPC ......... B62B 3/02; B62B 3/003; B62B 3/1472; B62B 5/0003; B62B 5/06; B62B 2202/50; B62B 2206/06
See application file for complete search history.

(56) References Cited

U.S. PATENT DOCUMENTS

| | | | | |
|---|---|---|---|---|
| 5,649,718 A | * | 7/1997 | Groglio | B62B 5/0003 280/43.17 |
| 6,045,150 A | * | 4/2000 | Al-Toukhi | B62B 3/027 248/676 |
| 6,575,491 B2 | * | 6/2003 | Miller | B62B 3/027 280/43.17 |
| 6,725,855 B1 | * | 4/2004 | Brennan | A47J 37/0763 126/276 |
| 8,083,253 B1 | * | 12/2011 | Butler | B62B 3/027 280/651 |
| 9,382,035 B2 | * | 7/2016 | Fritz | B62B 1/12 |
| 2018/0009461 A1 | * | 1/2018 | Rucker | B62B 3/022 |

* cited by examiner

*Primary Examiner* — Bryan A Evans
(74) *Attorney, Agent, or Firm* — J. Nevin Shaffer, Jr.

(57) ABSTRACT

A telescoping cart apparatus and method consists of a carrier configured to include receptacles for carrying cleaning materials. A carry handle is connected with the carrier where the carry handle is connected across the middle of the carrier. A divider is connected beneath the carry handle and is connected with the carrier such that the divider creates two separate sections of the carrier. Telescoping support legs are connected with the carrier where the telescoping support legs are adjustable from a retracted position within the carrier to an extended position outside of the carrier. An extendable adjustment handle is connected with the carrier. A button in the carry handle where the button is connected with the telescoping support legs for adjusting the positions of the telescoping support legs and wheels connected with the telescoping support legs.

20 Claims, 4 Drawing Sheets

TELESCOPING CART APPARATUS AND METHOD

CROSS REFERENCE TO RELATED APPLICATION

This application claims the benefit of previously filed U.S. provisional patent application No. 62/677,206 filed 29 May 2018 for a "Telescoping Cart Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to a technologically advantageous telescoping cart apparatus consisting of a carrier configured to include receptacles for carrying cleaning materials. A carry handle is connected with the carrier where the carry handle is connected across the middle of the carrier. A divider is connected beneath the carry handle and is connected with the carrier such that the divider creates two separate sections of the carrier. Telescoping support legs are connected with the carrier where the telescoping support legs are adjustable from a retracted position within the carrier to an extended position outside of the carrier. An extendable adjustment handle is connected with the carrier. A button in the carry handle is connected with the telescoping support legs for adjusting the positions of the telescoping support legs and wheels are connected with the telescoping support legs.

BACKGROUND OF THE INVENTION

Many jobs require repetitive motions and some require movement from place to place as well. Typically, tools used to complete the job must be carried from place to place and keeping track of them and other personal items becomes a time consuming and time wasteful process. By way of example only and not by limitation, house cleaning is a many faceted, multi-step process requiring access to and use of a wide variety of tools. The state of the art is to simply transport the cleaning materials, brooms, mops, cleaners, bags and the like to the place to be cleaned. The materials are then used selectively throughout the place with some materials and tools used at the start of the process and others used at the end and some throughout the entire process. Today a cleaning person must go back and forth between the staging area, where all the tools and materials are first located. This causes the cleaner to have to constantly stoop over and bend to pick up materials, over and over again throughout the process.

Carts have been found useful but are limited because they can only be used in flat, easily assessable areas and when a user must access other areas, the user must unload the cart and carry the materials back and forth as before. Further, carts are bulky and hard to transport.

Additionally, in today's work world, workers are connected electronically to their employers and customers and are virtually required to have their communication gear, phones and the like, with them at all times. Further, cleaners that use a vehicle to transport their tools and materials to the job site must account for their keys as well. In this case another issue is raised and that is assembling all the tools and cleaning materials in such a manner that they fit into the vehicle.

Thus, there is a need in the art for a system that addresses the aforementioned problems in a manner that is robust and flexible so as to accommodate a full spectrum of cleaning materials and tool shapes and dimensions and to present them at useful heights to eliminate the need to bend over. Further there is a need for a system that is useful in easily accessible areas and areas that prevent the use of a rolling cart. Still further there is a need for a carrying device that is converts to a cart and back again for ease in transporting it from location to location.

It therefore is an object of this invention to provide an improved telescoping cart apparatus for allowing a variety of tools and materials to be easily accessible and transportable both in and out of a vehicle in both an extended and a retracted position.

SUMMARY

Accordingly, an improved telescoping cart apparatus and method according to a preferred embodiment consists of a carrier configured to include receptacles for carrying cleaning materials. A carry handle is connected with the carrier where the carry handle is connected across the middle of the carrier. A divider is connected beneath the carry handle and is connected with the carrier such that the divider creates two separate sections of the carrier. Telescoping support legs are connected with the carrier where the telescoping support legs are adjustable from a retracted position within the carrier to an extended position outside of the carrier. An extendable adjustment handle is connected with the carrier. A button in the carry handle is connected with the telescoping support legs for adjusting the positions of the telescoping support legs and wheels are connected with the telescoping support legs.

In one aspect, the carrier includes a bag attachment device such that a trash bag is removably attachable to the bag attachment device.

In one aspect, the carrier further includes a drink holder.

In another aspect, the carrier further includes a side storage compartment.

In one aspect, the side storage compartment includes a receiver for personal items on the outside of the side storage compartment and in another aspect the personal items are selected from a group consisting of: keys and phones.

In another aspect, a telescoping cleaning device is removably attachable to the carrier and, in one aspect, the telescoping cleaning device is selected from a group of cleaning devices consisting of: mops and brooms.

In a further aspect, a rinsing wand is provided where the rinsing wand is removably attachable with a water source.

According to another embodiment, a telescoping cart apparatus includes a carrier configured to include receptacles for carrying cleaning materials where the carrier further includes a side storage compartment and where the side storage compartment includes a receiver for personal items on the outside of the side storage compartment. A carry handle is connected with the carrier where the carry handle is connected across the middle of the carrier. A divider is connected beneath the carry handle and connected with the carrier such that the divider creates two separate sections of the carrier. Telescoping support legs are connected with the carrier where the telescoping support legs are adjustable from a retracted position within the carrier to an extended position outside of the carrier. An extendable adjustment handle is connected with the carrier. A button in the carry handle is connected with the telescoping support legs for adjusting the positions of the telescoping support legs and wheels are connected with the telescoping support legs.

In other aspects, the carrier includes: a bag attachment device such that a trash bag is removably attachable to the bag attachment device; a drink holder; the personal items are selected from a group consisting of: keys and phones; a telescoping cleaning device removably attachable to the carrier; the telescoping cleaning device is selected from a group of cleaning devices consisting of: mops and brooms; and a rinsing wand where the rinsing wand is removably attachable with a water source.

According to another embodiment, a telescoping cart method consists the steps of:

a. providing a carrier configured to include receptacles for carrying cleaning materials; a carry handle connected with the carrier where the carry handle is connected across the middle of the carrier; a divider connected beneath the carry handle connected with the carrier such that the divider creates two separate sections of the carrier; telescoping support legs connected with the carrier where the telescoping support legs are adjustable from a retracted position within the carrier to an extended position outside of the carrier. An extendable adjustment handle connected with the carrier. A button in the carry handle is connected with the telescoping support legs for adjusting the positions of the telescoping support legs and wheels are connected with the telescoping support legs; and b. placing cleaning materials in the carrier.

In one aspect, the method further includes the steps of extending the telescoping support legs and the extendable adjustment handle to extended positions.

In another aspect, the carrier further includes a side storage compartment and where the side storage compartment includes a receiver for personal items on the outside of the side storage compartment.

In a further aspect, the carrier includes:

a. a bag attachment device such that a trash bag is removably attachable to the bag attachment device;

b. a telescoping cleaning device removably attachable to the carrier where the telescoping cleaning device is selected from a group of cleaning devices consisting of: mops and brooms; and c. a rinsing wand where the rinsing wand is removably attachable with a water source.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
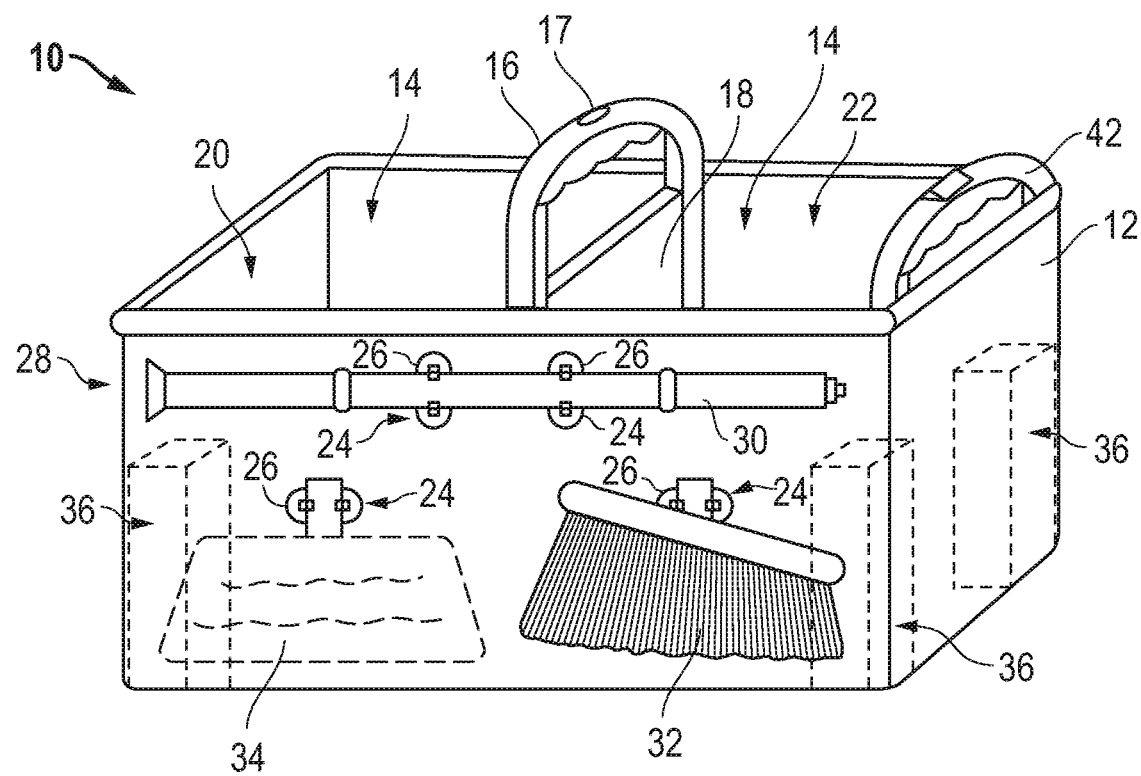
FIG. 1 is a side perspective view of the carrier in the collapsed position and with the extendable adjustment handle in the un-extended position.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described device may be altered so that certain processes are conducted in parallel or independent, with other processes, to the extent that the processes are not dependent upon each other. Thus, the specific order of steps when described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
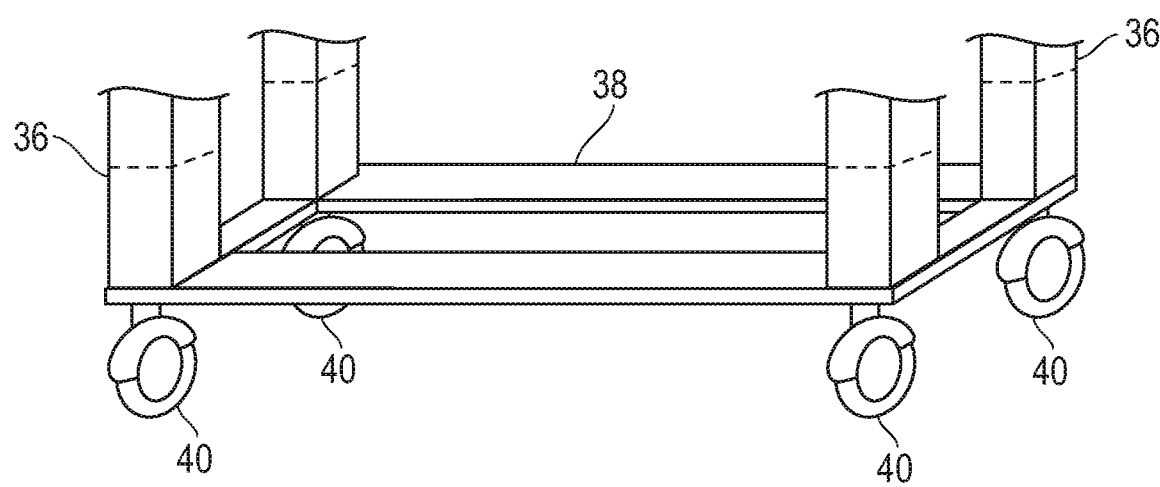
FIG. 2 is a side perspective view of the telescoping support legs in the partially un-extended position.

One embodiment of the present invention is illustrated by way of example in FIGS. 1-5. Referring now to FIGS. 1 and 2, telescoping cart apparatus and method 10 consists of a carrier 12 configured to include receptacles 14 for carrying cleaning materials (not shown for clarity) such as sprays, washes, cleansers, and the like, as are known and not described more fully hereafter. All terms used herein are given their common meaning and "carrier" describes a carrier that is an independent carrying device when in the "collapsed position" as shown in FIG. 1. A carry handle 16 is connected with the carrier 12 where the carry handle 16 is connected across the approximate middle of the carrier 12 as shown. It is shown attached across the width of carrier 12 but it could, of course, be connected across the length. Preferably, a divider 18 is connected beneath the carry handle 16 and is connected with the detachable carrier 12 such that the divider 18 creates two separate receptacles 14, sections 20 and 22 of the carrier 12. Again, the divider may run across the width or, if desired, down the middle of the length of carrier 12. Also, if desired, there may be more than one divider 18.

FIG. 1 also shows attachment devices 24 connected with carrier 12 where the attachment devices 24 are used to attach a telescoping cleaning device 28 consisting of a telescoping handle 30 and a removably attachable broom 32 and mop 34. Telescoping handle 30 is shown in FIG. 1 in the un-extended position and un-attached to either the broom 32 or the mop 34 and not shown further as the extension and connection features are understood to those of ordinary skill.

Attachment devices 24 are shown as flexible U-shaped halves 26 that spread apart at the item is pressed in place and then return to an un-spread position as shown in FIG. 1 to hold the item in place. Any attachment device 24 such as hook and loop material or straps or otherwise as are now known or hereafter developed that are suitable to meet the function of the attachment devices 24 are acceptable according to the invention.

Figure 3:
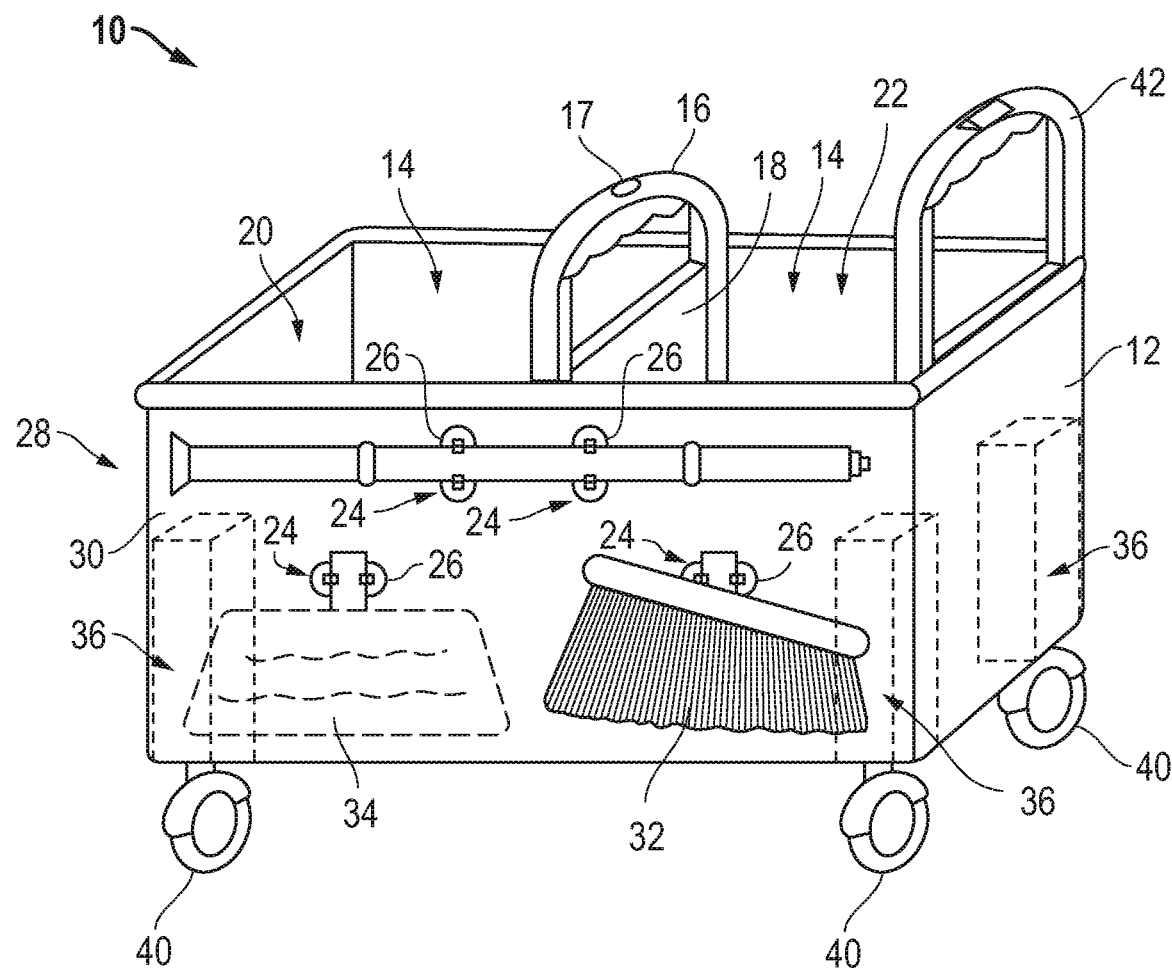
FIG. 3 is a side perspective view of the invention of FIGS. 1 and 2 of the carrier with the telescoping support legs in the un-extended position and with the extendable adjustment handle in the extended position; along with an illustration of the removably attachable handle and a broom and mop.

Referring now to FIG. 2, independent telescoping support legs 36 are shown separately, for clarity, in the partially un-extended position. The telescoping support legs 36 fit within the carrier 12 in the collapsed position such that just the wheels 40 extend from the bottom of carrier 12 as shown in FIG. 3. This structure, the carrier 12 and the telescoping support legs 36 in the un-extended position, facilitates among other things the easy loading and unloading of the apparatus into a vehicle (not shown) particularly smaller vehicles that can accommodate several small items but not one big device. Also, as a unique technologically advantageous feature of the invention, when in the collapsed position, carrier 12 serves the purpose of a carrier for transporting cleaning materials to areas unsuitable for rolling carts.

Figure 4:
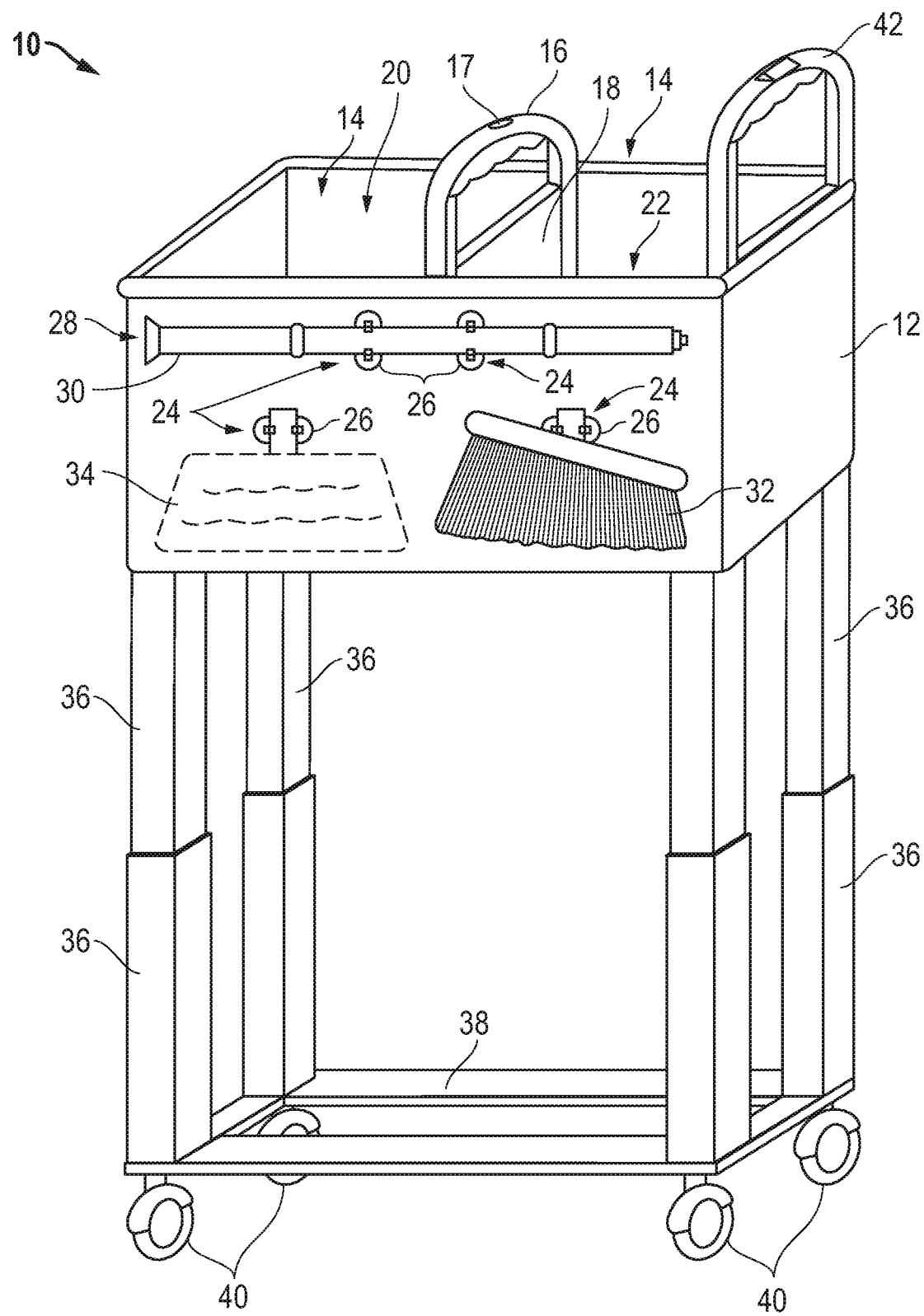
FIG. 4 is a side perspective view of the invention illustrated in FIG. 3 with the telescoping support legs in the extended position and illustrating the attachment of a broom and mop and removably attachable handle.
Figure 5:
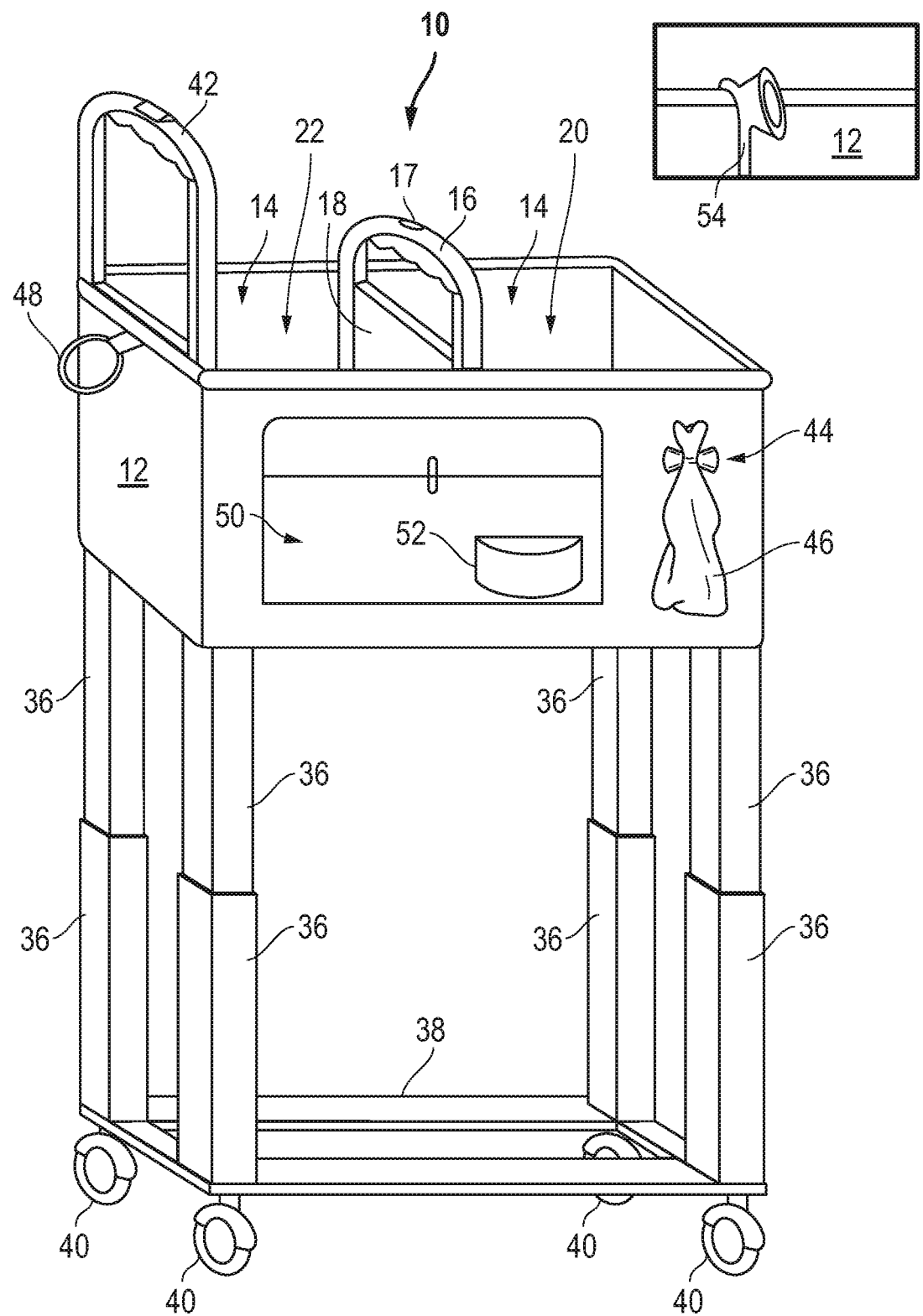
FIG. 5 is a perspective view of the side opposite to that shown in FIG. 4 illustrating the side storage compartment and the receiver for personal items on the outside of the side storage compartment.

Telescoping support legs 36 are connected with the carrier 12 where the telescoping support legs 36 are adjustable from a retracted position within carrier 12, as shown in FIGS. 2 and 3, to an extended position, as shown in FIGS. 4 and 5. The dotted lines in the telescoping support legs 36 shown in FIG. 2 indicate the collapsed sections of the support legs that are contained within the outer support legs. Further the dotted lines in carrier 12 in FIGS. 1 and 3 show that the telescoping legs 36 fit within carrier 12 in the un-extended position.

FIG. 2 shows that telescoping support legs 36 are connected to a support platform 38 and that, preferably, wheels 40 are connected with the support platform 38 and telescoping legs 36 as shown.

FIG. 1 shows an extendable adjustment handle 42 is connected with the carrier 12 and in an un-extended position. In the extended position, as shown in FIGS. 3, 4 and 5, extendable adjustment handle 42 facilitates movement of the carrier 12 either by pulling or pushing on the handle 42. Importantly, FIGS. 1 and 3 show button 17. Button 17 is connected with telescoping support legs 36 for adjusting the positions of the telescoping support legs 36. That is, when button 17 is depressed, telescoping support legs 36 are released and as handle 16 is lifted, telescoping support legs 36 extend to the extended position shown in FIGS. 4 and 5. Certainly, the telescoping support legs 36 could include stops for retaining them in positions in-between collapsed and fully extended. Also, springs or other mechanisms may be used to assist in extending the support legs 36 when deemed useful.

Further, FIG. 3 shows that extendable adjustment handle 42 is adjustable from a collapsed position as shown in FIG. 1 to an extended position shown in FIGS. 3, 4 and 5.

Referring to FIGS. 4 and 5, carrier 12 is shown connected with telescoping support legs 36 and extendable adjustment handle 42 is in the extended position and the telescoping support legs 36 are also in the extended position. Thus, a fully functional robust rolling cleaning cart is provided that accommodates a large number of cleaning supplies and equipment that typically must be moved separately from room to room that are heavy and awkward to move. When desired, carrier 12 may, however, still be used with the telescoping support legs 36 in the collapsed position as shown in FIG. 3 to carry materials to areas that do not accommodate a rolling, extended support device. For example, in a two story house, the invention may be rolled from room to room and then collapsed to easily carry the equipment and materials up stairs. Once up stairs, the legs are re-extended and the rolling cart can be moved easily about the second floor.

Referring now to FIG. 5, preferably carrier 12 includes a bag attachment device 44 such that a trash bag 46 is removably attachable to the bag attachment device 44. Bag attachment device 44 is shown as a clasp that attaches to the trash bag 46 but may be any type of bag attachment device now known or hereafter developed.

FIG. 5 also shows carrier 12 where it further includes a drink holder 48. Preferably, carrier 12 further includes a side storage compartment 50 and, still further, where the side storage compartment 50 includes a receiver 52 for personal items, such as phone and keys (not shown for clarity) on the outside of the side storage compartment 52.

Additionally, FIG. 5 shows a rinsing wand 54 where the rinsing wand 54 is removably attachable with a water source (not shown). Rinsing wand 54 is an example of a common cleaning device that is awkward to transport yet needed from time to time when cleaning Applicant's carrier 12 and telescoping support leg 36 combination provide the structure needed to accommodate rinsing wand 54 and many other required cleaning implements and materials easily and efficiently.

Importantly, while many carts with wheels exist, a cart that includes a carrier and separately extendable telescoping support legs on wheels that are also collapsible into the carrier such that it fits easily within a vehicle and then, in use, expands such that a user is relieved of the necessity to constantly bend over to pick up cleaning tools is unique in the art. The ability of a user to easily locate required tools throughout the work place and to carry them from areas that do not allow use of a rolling cart to areas that do and to easily convert to a rolling cart as the user proceeds with the job, is also unique in the field.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:
1. A telescoping cart apparatus comprising:
 a. a carrier configured to include receptacles for carrying cleaning materials;
 b. a carry handle connected with the carrier wherein the carry handle is connected across the middle of the carrier;

c. a divider connected beneath the carry handle connected with the carrier such that the divider creates two separate sections of the carrier;

d. telescoping support legs connected with said carrier wherein said telescoping support legs are adjustable from a retracted position within the carrier to an extended position outside of the carrier;

e. an extendable adjustment handle connected with the carrier;

f. a button in said carry handle wherein said button is connected with the telescoping support legs for adjusting the positions of the telescoping support legs; and g. wheels connected with the telescoping support legs.

2. The apparatus of claim 1 wherein said carrier includes a bag attachment device such that a trash bag is removably attachable to the bag attachment device.

3. The apparatus of claim 1 wherein said carrier further includes a drink holder.

4. The apparatus of claim 1 wherein said carrier further includes a side storage compartment.

5. The apparatus of claim 4 wherein the side storage compartment includes a receiver for personal items on the outside of said side storage compartment.

6. The apparatus of claim 5 where the personal items are selected from a group consisting of: keys and phones.

7. The apparatus of claim 1 further including a telescoping cleaning device removably attachable to the carrier.

8. The apparatus of claim 7 wherein the telescoping cleaning device is selected from a group of cleaning devices consisting of: mops and brooms.

9. The apparatus of claim 1 further including a rinsing wand where the rinsing wand is removably attachable with a water source.

10. A telescoping cart apparatus comprising:

a. a carrier configured to include receptacles for carrying cleaning materials wherein said carrier further includes a side storage compartment and wherein the side storage compartment includes a receiver for personal items on the outside of said side storage compartment;

b. a carry handle connected with the carrier wherein the carry handle is connected across the middle of the carrier;

c. a divider connected beneath the carry handle connected with the carrier such that the divider creates two separate sections of the carrier;

d. telescoping support legs connected with said carrier wherein said telescoping support legs are adjustable from a retracted position within the carrier to an extended position outside of the carrier;

e. an extendable adjustment handle connected with the carrier and the telescoping support legs for adjusting the positions of the support legs and the extendable adjustment handle;

f. a button in said carry handle wherein said button is connected with the telescoping support legs for adjusting the positions of the telescoping support legs; and g. wheels connected with the telescoping support legs.

11. The apparatus of claim 10 wherein said carrier includes a bag attachment device such that a trash bag is removably attachable to the bag attachment device.

12. The apparatus of claim 10 wherein said carrier further includes a drink holder.

13. The apparatus of claim 10 where the personal items are selected from a group consisting of: keys and phones.

14. The apparatus of claim 10 further including a telescoping cleaning device removably attachable to the carrier.

15. The apparatus of claim 14 wherein the telescoping cleaning device is selected from a group of cleaning devices consisting of: mops and brooms.

16. The apparatus of claim 10 further including a rinsing wand where the rinsing wand is removably attachable with a water source.

17. A telescoping cart method comprising the steps of:

a. providing a carrier configured to include receptacles for carrying cleaning materials; a carry handle connected with the carrier wherein the carry handle is connected across the middle of the carrier; a divider connected beneath the carry handle connected with the carrier such that the divider creates two separate sections of the carrier; telescoping support legs connected with said carrier wherein said telescoping support legs are adjustable from a retracted position within the carrier to an extended position outside of the carrier; an extendable adjustment handle connected with the carrier and the telescoping support legs for adjusting the positions of the support legs and the extendable adjustment handle; a button in said carry handle wherein said button is connected with the telescoping support legs for adjusting the positions of the telescoping support legs and wheels connected with the telescoping support legs; and b. placing cleaning materials in said carrier.

18. The method of claim 17 further including the steps of extending the telescoping support legs and the extendable adjustment handle to extended positions.

19. The method of claim 17 wherein said carrier further includes a side storage compartment and wherein the side storage compartment includes a receiver for personal items on the outside of said side storage compartment.

20. The method of claim 17 wherein said carrier includes:

a. a bag attachment device such that a trash bag is removably attachable to the bag attachment device;

b. a telescoping cleaning device removably attachable to the carrier wherein the telescoping cleaning device is selected from a group of cleaning devices consisting of: mops and brooms; and c. a rinsing wand where the rinsing wand is removably attachable with a water source.

* * * * *